US007633060B2

(12) United States Patent
Kovtoun

(10) Patent No.: US 7,633,060 B2
(45) Date of Patent: Dec. 15, 2009

(54) SEPARATION AND AXIAL EJECTION OF IONS BASED ON M/Z RATIO

(75) Inventor: Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 308 days.

(21) Appl. No.: 11/789,396

(22) Filed: Apr. 24, 2007

(65) Prior Publication Data

US 2008/0265155 A1 Oct. 30, 2008

(51) Int. Cl.
*B01D 59/44* (2006.01)
*H01J 49/00* (2006.01)

(52) U.S. Cl. ....................... 250/292; 250/282; 250/283; 250/290

(58) Field of Classification Search ................. 250/281, 250/282, 283, 290, 292
See application file for complete search history.

(56) References Cited

U.S. PATENT DOCUMENTS 5,576,540 A 11/1996 Jolliffe
5,679,950 A 10/1997 Baba et al.
5,696,376 A * 12/1997 Doroshenko et al. ........ 250/292
5,783,824 A 7/1998 Baba et al.
5,847,386 A 12/1998 Thomson et al.
5,864,136 A * 1/1999 Kelley et al. ................ 250/282
6,111,250 A 8/2000 Thomson et al.
6,163,032 A 12/2000 Rockwood
6,177,668 B1 1/2001 Hager
6,403,955 B1 6/2002 Senko
6,483,109 B1 11/2002 Reinhold et al.
6,504,148 B1 1/2003 Hager
6,703,670 B1 3/2004 Lines
6,713,757 B2 3/2004 Tanner et al.
6,791,078 B2 9/2004 Giles et al.
6,833,544 B1 12/2004 Campbell et al.

(Continued)

FOREIGN PATENT DOCUMENTS

WO WO 00/73750 A2 12/2000

OTHER PUBLICATIONS

Hashimoto et al., "Mass Selective Ejection by Axial Resonant Excitation from a Linear Ion Trap," J Am Soc Mass Spectrom, Elsevier Inc., p. 685-690, (2006).

*Primary Examiner*—Jack I Berman
*Assistant Examiner*—Brooke Purinton
(74) *Attorney, Agent, or Firm*—David E. Allred; Charles B. Katz

(57) ABSTRACT

A mass spectrometer includes a multipole having a main RF field for radially containing ions generally on a central axis. The multipole has first and second axial DC fields in opposite first and second direction along a length of the multipole. The first and second axial DC fields approach or add substantially to zero on the central axis. The multipole has an excitation voltage applied thereto for selectively exciting the ions of desired m/z ratios off the central axis. The excitation voltage thus causes excursion of the ions into a region where either the first or second axial DC field is strong. Thus, excitation of the ions and the DC fields cause ion drift toward a front end or a back end of the multipole. Further excitation moves the ions into regions of the DC fields that overcome barriers and causes axial ejection of the ions from the multipole.

12 Claims, 6 Drawing Sheets

U.S. PATENT DOCUMENTS

| | | | | |
|---|---|---|---|---|
| 7,019,290 | B2 | 3/2006 | Hager et al. | |
| 7,041,967 | B2 | 5/2006 | Hager | |
| 7,045,797 | B2 | 5/2006 | Sudakov et al. | |
| 7,049,580 | B2 | 5/2006 | Londry et al. | |
| 7,067,802 | B1 | 6/2006 | Kovtoun | |
| 7,084,398 | B2 | 8/2006 | Lobada et al. | |
| 7,459,679 | B2 * | 12/2008 | Loboda | 250/292 |
| 2004/0108456 | A1 | 6/2004 | Sudakov et al. | |
| 2005/0253064 | A1 | 11/2005 | Loboda et al. | |

* cited by examiner

SEPARATION AND AXIAL EJECTION OF IONS BASED ON M/Z RATIO

FIELD OF THE INVENTION

The present invention relates generally to multipole devices used as ion traps or for storage and separation of ions in a mass spectrometer, and more specifically to such a multipole configured for selective axial ejection of ions.

BACKGROUND OF THE INVENTION

As will be shown and described below, the storage and separation in accordance with the present invention may be applied in any of a variety of multipoles that function as collision cells or ion traps. One example of a multipole in which the embodiments of the present invention may be applied is an RF-only multipole. RF-only multipole structures are widely used in mass spectrometers as ion guides and/or collision cells. Generally described, RF-only multipoles consist of four or more elongated rods that bound an interior region through which ions are transmitted. The ions enter and exit the multipole rod set axially. A radio-frequency (RF) voltage is applied to opposed rod pairs to generate an RF field which confines the ions radially and prevents ion loss arising from collision with the rods. RF-only multipoles are operationally distinguishable from standard quadrupole mass filters, which utilize a DC electric field component in the radial direction to enable separation of ions according to mass-to-charge (m/z) ratio. As the name denotes, RF-only multipoles omit the DC field component in the radial direction and thus allow passage of ions having differing m/z ratios.

In many mass spectrometers, the ion source (such as an electrospray ionization (ESI) source, an atmospheric pressure chemical ionization (APCI) source, as well as certain types of matrix-assisted laser desorption ionization (MALDI) sources) operates at a significantly higher pressure relative to the pressure in the mass analyzer region. Due to collisional damping effects (which reduce the kinetic energy and improve transmission efficiency of ions within the multipole) it may be desirable or necessary to provide an axial DC field in an RF-only multipole located in a high-pressure or intermediate-pressure region within a mass spectrometer to assist in propelling the ions along the longitudinal axis of the multipole. Generation of the axial DC field is commonly achieved by using (i) segmented RF-only multipoles with variable DC offset voltages between segments; (ii) tilted or shaped appropriately auxiliary metal rods positioned in gaps between RF rods; or, (iii) a set of supplemental auxiliary rods (metal segments or isolator covered with resistive material), located between the main RF rods and being arranged substantially parallel thereto. In the last case, an axial DC potential gradient is created by applying a first voltage to corresponding first ends of the auxiliary rods and a second voltage to corresponding second (opposite) rod ends. The use of auxiliary rods and related techniques for generating an axial DC field in RF-only multipoles is disclosed in, for example, U.S. Pat. No. 6,111,250 by Thomson et al., entitled "Quadrupole with Axial DC Field."

The implementation of auxiliary rods in RF-only multipoles may complicate the operation of transfer optics in mass spectrometers. A notable operationally significant challenge is that the DC potential in the radial plane orthogonal to the major longitudinal axis of the multipole may vary significantly with angular and radial position, being dependent upon the geometry of both rod sets and the differences in DC voltages applied. Poor homogeneity of DC potential may adversely affect ion transmission efficiency because of high order (such as octopole) DC fields, especially when large excursion of ion trajectories from the major longitudinal axis occurs.

Because of these problems, there is a need to be able to better control ion movement and storage throughout a multipole. This is especially true when it is desired to handle large numbers of ions and/or ions having a large range of m/z. Relatedly, there is a need to be able to efficiently and selectively eject ions axially from the multipole. These needs are pertinent to a variety of multipoles including those that have radial DC components as well as in RF-only multipoles. Many patents have addressed related details, but have done so for other purposes, as may be noted in the following paragraphs.

U.S. Pat. Nos. 6,177,668; 7,041,967; 6,504,148; 7,019,290; and 6,703,670 to Hager et al. have methods and apparatuses that depend on use of an RF or AC induced fringing field for axial ejection. These patents teach selectively moving or oscillating ions within the multipoles of traps, filters or an ion guide by an auxiliary RF field. These patents disclose ejecting ions axially by utilizing fringing fields and auxiliary RF fields.

U.S. Pat. No. 7,045,797 to Sudakov et al. (and prior publication of US Patent Publication 2004/0108456) has axial ejection that is effectuated by moving the ions into a fringing field similar to the disclosure of Hager '668 or by a DC modulation to bring ions into resonance with an AC excitation field.

The U.S. Pat. Nos. 5,847,386 and 6,111,250 to Thomson et al. and the U.S. Pat. No. 6,163,032 to Rockwood have opposite axial DC fields caused by pairs of rods forming transverse planes that generally appear to intersect on the central axis of a multipole. The opposite fields are effectuated by rods that are sloped or tapered in opposite directions along the central axis. However, the disclosures of Thomson et al. teach that the axial fields are for transport of ions axially through fringing fields. Rockwood has an improvement to the Thomson configuration in which Rockwood teaches removing quadrupolar and high band pass effects that are typically induced by applying axial DC fields to a multipole.

U.S. Pat. No. 6,713,757 to Tanner et al. has tapered and/or sloped rods in a multipole for axially moving ions similar to the Thomson and Rockwood patents.

US Patent Application, Publication No. 2005/0253064 A1 to Loboda et al. and U.S. Pat. No. 7,084,398 B2 to Loboda et al. utilize AC fields for containing ions radially and static axial fields for urging ions axially. Segmentation or coating of the rods as well as auxiliary electrodes for applying a DC gradient voltage along a length of the rods is disclosed. Also, both AC and DC voltages are applied to each of the segments. That is, Loboda appears to apply a DC voltage gradient in a set of rods and at the same time maintain a main RF that acts in a conventional manner to contain the ions. The references to Loboda also describe controlling distribution of ions in a multipole.

U.S. Pat. No. 7,049,580 to Londry et al. is directed to fragmentation and has shaped rods for controlling axial movement of ions. However, the voltages applied to diametrically opposed pairs of the rods are identical to each other. Londry also teaches damping with higher order multipole configurations to inhibit ejection of ions from a trap.

U.S. Pat. Nos. 5,679,950 and 5,783,824 to Baba have shaped or segmented rods. Baba 5,783,824 has auxiliary rods installed in gaps between adjacent main RF rods. Axial DC voltage gradients are applied to the shaped auxiliary rods.

This and/or an additional RF voltage creates an overall harmonic axial field for oscillating and ejecting ions axially.

U.S. Pat. No. 5,576,540 to Jolliffe discloses moving ions off center, but regularly ejects ions radially. Jolliffe's disclosure does state that the direction of ejection does not matter. Jolliffe also describes adjusting the DC field in a manner that will not interfere with the fringing fields.

U.S. Pat. No. 7,067,802 to Kovtoun has a resistive path forming an axial DC gradient on RF only rods.

U.S. Pat. No. 6,791,078 B2 to Giles et al. has a mobility separator mass spectrometer. This device uses a transient DC voltage to move ions axially U.S. Pat. No. 6,833,544 to Campbell et al. has axial ejection as is apparent from the Figures and description. Campbell et al. has an axial DC field that is created by DC voltage gradients applied to segmented rods. The disclosure of Campbell et al. teaches ejection by increasing the amplitude of the auxiliary RF.

SUMMARY OF THE INVENTION

In order to meet the needs described above, embodiments of the present invention include a mechanism and method for manipulating ions that are deep within a multipole, which multipole may function as an ion storage device or ion trap. Embodiments of the present invention show promise of greater ion selectivity than has been achieved previously with large samples or those having large ranges of m/z. As such, it appears that increased ion storage capacity can be achieved while at the same time maintaining good m/z separation. That is, embodiments of the present invention enable increased abundance of ion population in a multipole, while maintaining effective m/z separation from substantially a whole length of the multipole. Thus, high selectivity in separation and ejection of ions is achieved. The ions may be injected from the multipole into a mass analyzer, which may include one or more of an ion trap, an FT system, an orbi-system, a hybrid system, and other analyzer systems. For purposes of this disclosure, it is to be understood that the term analyzer is considered to include any device capable of separating ions based on one or more of m/z, charge, species, ion mobility and combinations thereof, for example.

It is to be understood that there are certain practices or steps that have become accepted for manipulating ions in a multipole. The embodiments of the present invention build upon these practices or steps. Generally, these steps may include populating the multipole with ions and permitting them to spread out in the multipole. This spreading may include cooling down the ions by a collision gas in at least a portion of the multipole. The collision gas may be introduced at a location relative to vacuum pumps and orifices in a mass spectrometer, for example, that causes relatively high pressure at one end of the multipole while maintaining a relatively low pressure at the other end. In this way, the multipole acts as a collision cell having good cooling at the high pressure end and strong resonance due to the low pressure at the other end. Another step that may be applied to contain the ions axially in multipole is to trap the ions by placement of one or more barriers to which blocking voltages are applied. With barriers applied, the ions will tend to move the center of the multipole as they are cooled. Thus, the ions may be trapped in the multipole. Once the ions enter the multipole, they may be generally spread along a length of the multipole by their natural flow and space charge effects or by controlling them at one or more locations by the effects of one or more of a main RF, an auxiliary RF, and one or more DC fields. The main RF field contains the ions radially and urges them to remain on a central axis of the multipole.

Embodiments of the present invention enable controlled spreading including mass selective separation and movement of ions in samples having large ranges of m/z based on m/z along a length of the multipole. It also enables mass selective axial ejection of these ions. Furthermore, these steps may be achieved while lessening the adverse effects of space charges including interference with the ability to move other ions in the multipole or loss of ions out the ends of the multipole.

In a simple form, an embodiment of the present invention includes a mass analyzer having a multipole device with at least a set of main rod electrodes. The mass analyzer includes an RF voltage source for applying an RF voltage to the set of main rod electrodes to radially confine ions within the multipole interior, and to generally concentrate the ions along a central axis of the multipole. The mass analyzer has an excitation voltage source coupled to the multipole. The excitation voltage source is for applying an excitation voltage to mass-selectively excite ions in the multipole interior such that radial extents of trajectories of the excited ions are increased. The mass analyzer also has a DC voltage source that is operably coupled to the multipole. The DC voltage source is for applying DC voltages to generate an axial DC field. A magnitude of the axial DC field increases with radial distance from the central axis to axially separate excited ions from the remaining ions.

In one embodiment, the multipole device further includes auxiliary rod electrodes generally interposed between rods of the set of main rod electrodes. In this embodiment, the DC voltage is applied to the auxiliary rod electrodes and has a voltage gradient oriented in an axial direction. The auxiliary rod electrodes may include two pairs of diametrically opposed auxiliary rod electrodes. Each pair of the diametrically opposed auxiliary rod electrodes may be disposed in a respective plane. The planes may be transverse to each other and intersect substantially on the central axis. The auxiliary rod electrodes can be electrodes creating opposing DC fields that substantially add to or approach zero on the central axis.

In this and other embodiments, the excitation voltage may be applied to the set of main rod electrodes. The excitation voltage can be applied to preferentially urge ions of a predetermined mass to charge (m/z) ratio toward a particular one of the planes. In this way, the radial extents of the trajectories of the excited ions can be preferentially increased in a first plane defined by the first pair of diametrically opposed auxiliary rod electrodes, for example.

In another embodiment, the excitation voltage can be applied to a first pair of diametrically opposed auxiliary rod electrodes. The excitation voltage can thus urge ions of a first m/z ratio away from the central axis generally in a first plane of the first pair of diametrically opposed auxiliary rod electrodes. The excited ions are then moved by an axial force toward an end of the multipole. The excitation voltage can be additionally applied to a second pair of diametrically opposed auxiliary rod electrodes. The excitation voltage can thus urge ions of a second m/z ratio away from the central axis generally in the second plane of the second pair of diametrically opposed auxiliary rod electrodes. Once again, the excited ions are then moved by an axial force toward an end of the multipole.

In still another embodiment, the excitation voltage and the DC voltages are applied to the set of main rod electrodes to which the main RF voltage is also applied. The main RF voltage contains the ions radially within the mass analyzer. The excitation voltage resonantly excites the ions of a predetermined m/z away from the central axis. A first set of DC voltages are applied to a first main rod electrode pair to create a first axial DC voltage gradient. A second set of DC voltages are applied to a second main rod electrode pair to create a second axial DC voltage gradient having a sign opposite to the first axial DC voltage gradient. The first pair of diametrically opposed main rod electrodes can be in a first plane, and the second pair of diametrically opposed main rod electrodes can be in a second plane. The first and second planes can be transverse to each other and intersect substantially on the central axis. The excitation voltage source is configured to apply an excitation voltage across at least one of the first and second main rod electrode pairs to mass selectively excite ions. The excited ions experience the axial force that moves them toward an end of the multipole. The level of excitation and range of frequencies of the excitation voltage may be chosen such that ions having m/z of interest remain resonantly excited long enough to separate, move, and/or eject them as desired.

Excitation by the excitation voltage in the first pair of diametrically opposed main rod electrodes urges selected ones of the ions having a first predetermined m/z ratio away from the central axis substantially in the first plane, and excitation by the excitation voltage in the second pair of diametrically opposed main rod electrodes urges selected ones of the ions having a second predetermined m/z ratio away from the central axis substantially in the second plane.

The excitation voltage may be applied across at least two of the main rod electrodes. The excitation voltage can be applied to preferentially urge ions of a predetermined m/z ratio toward a particular one of the planes. The DC voltages applied to the main rod electrodes are selected such that the axial DC field has a magnitude approaching zero at the central axis.

In another simple form, embodiments of the present invention may include the multipole having rod electrodes arranged in first and second diametrically opposed rod electrode pairs, which may be main rod electrode pairs. The first and second rod electrode pairs define respective first and second planes that intersect at the central axis. A first set of DC voltages are applied to the first rod electrode pair to create a first axial DC voltage gradient. A second set of DC voltages are applied to the second rod electrode pair to create a second axial DC voltage gradient having a sign opposite to the first axial DC voltage gradient. An excitation voltage may be applied to at least one of the first and second rod electrode pairs. The excitation voltage may include at least a first waveform having a first frequency and a second waveform having a second frequency different from the first frequency. The first wave form may excite ions of a first m/z and cause the ions of the first m/z to have an increased first trajectory about the central axis. The second wave form may excite ions of a second m/z and cause the ions of the second m/z to have an increased second trajectory different from the first trajectory about the central axis. The first trajectory may thus place the ions of the first m/z predominantly in the first plane at a radial distance from the central axis at which effects of the first set of DC voltages together with the combined effects of the main RF and auxiliary RF voltages eject the ions of the first m/z from the multipole in a first axial direction. The second trajectory may place the ions of the second m/z predominantly in the second plane at a radial distance from the central axis at which the second set of DC voltages ejects the ions of the second m/z from the multipole in a second axial direction opposite the first axial direction.

It is to be understood that embodiments of the present invention may include a mass spectrometer having the mass analyzer described herein. The mass analyzer may be a first mass analyzer within the mass spectrometer. The mass spectrometer may further include a second mass analyzer operably connected to the first mass analyzer in an ion stream of the mass spectrometer. The first mass analyzer may be utilized, among other things, to eject ions into the second mass analyzer. The second mass analyzer may be any one of an ion trap or other storage device, a time-of-flight (TOF) analyzer, an FT analyzer, an orbi-analyzer, a hybrid or any combination thereof. Alternatively, the second mass analyzer may be replaced or complimented by other ion optical elements in place of, within, upstream, or downstream of the second mass analyzer including one or more of an ion guide, collision cell, and a detector for detecting a mass spectrum.

In another simple form, embodiments of the present invention include a method of separating ions. The method of separating ions includes radially confining ions within an interior of a multipole by generating an RF field, and generating an axial DC field within the multipole interior. The DC voltages are applied such that a magnitude of the resultant DC field generally increases with distance from a central axis within one or more specific plane(s). The method also includes mass selectively exciting ions to cause the radial extents of the excited ions to increase. This causes the excited ions to be axially separated from the remaining ions.

As such, the embodiments of the present invention are directed to a apparatus and method that have advantages of improved selectability. The selectability provided by the embodiments of the present invention is greater than that available with axial ejection that uses fringing fields, at least for cases in which the ion population is great or when there is a large range of m/z. The devices in accordance with embodiments of the present invention start separating ions by m/z in a whole length of the multipole device. Thus, ions can travel mass selectively throughout a length of the uniform field and are not limited to mass selective travel only in the fringing field regions near the ends of the multipole. Use of fringing fields for ejection, as applied in past devices, requires ions to be in close proximity to ends of the multipole devices. Therefore, selectability in ion separation/isolation by m/z of the devices of the past suffers from negative space charge effects. That is, in the regions near the ends, space charge effects actually change the resonant frequencies of the ions and thus adversely affect selectivity.

Another advantage includes the possibility of spreading out the ions within the multipole by placing them at both ends of the multipole device. Thus, the multipole device enables storing and ejecting larger numbers of ions of a specific m/z ratio or range of ratios than was possible with multipole analyzers of the past. The embodiments of the present invention enable filling of an ion trap or other multipole mass analyzer to a greater extent with these ions than was possible with past devices and enables doing so in a controllable manner. The embodiments of the present invention also enable filling the ion trap or other multipole analyzer in a way that decouples the ions from the mass distribution originated in the ion source.

Another advantage that the embodiments of the present invention provide is that of filling the trap or analyzer with the ions by causing ion drift toward ends of a linear multipole by one or more DC fields. Thus, a main RF field can be applied to a plurality of rod electrodes of a multipole for conventional RF only operation. An auxiliary RF field can be applied to these rod electrodes to resonantly excite ions of predetermined m/z away from a central axis of the multipole, and the one or more DC voltages can be applied to generate axial DC field(s) that cause ion drift toward the end(s) of the multipole.

The foregoing and other features and advantages of the present invention will be apparent from the following more detailed description of the particular embodiments of the invention, as illustrated in the accompanying drawings.

BRIEF DESCRIPTION OF THE DRAWINGS

Like reference numerals refer to corresponding parts throughout the several views of the drawings.

DETAILED DESCRIPTION OF EMBODIMENTS

Multipole devices are filled with ions to be analyzed. The ions are permitted to spread along a length of the multipole. Collision cooling may be applied at one or more positions along a length of the multipole. When barriers are placed upstream and downstream of the multipole, collisional cooling results in the ions generally moving axially toward a center of the multipole. Additional potential wells may be incorporated by selecting potentials for segments along a length of rod electrodes of the multipole, for example. A main RF voltage is applied to the multipole to confine the ions radially and urge them to reside on a center line or central axis of the multipole. An auxiliary RF or excitation voltage (denoted as AC in the Figures) may be applied and together with the main RF may excite ions of a preselected m/z off the central axis. This excitation has typically been done by moving the preselected ions of a desired m/z into fringing fields near ends of the multipole. One of the drawbacks of moving the preselected ions into the ends of the multipole and manipulating them in the fringing fields is that the ions suffer from space charge effects. The frequency distribution of all the ions (preselected and non-preselected) in the ends of the multipole is affected by moving the ions closer to each other in the ends of the multipole in order to manipulate them, and the ability of the system to excite the preselected ions of the desired m/z is adversely affected. There has been a need to overcome these drawbacks and negative effects. The embodiments of the present invention represent a solution that avoids these negative space charge effects. Among other things, this is accomplished by providing apparati and methods that create a combination of fields for manipulating the ions of preselected m/z deep inside the multipole.

Figure 1:
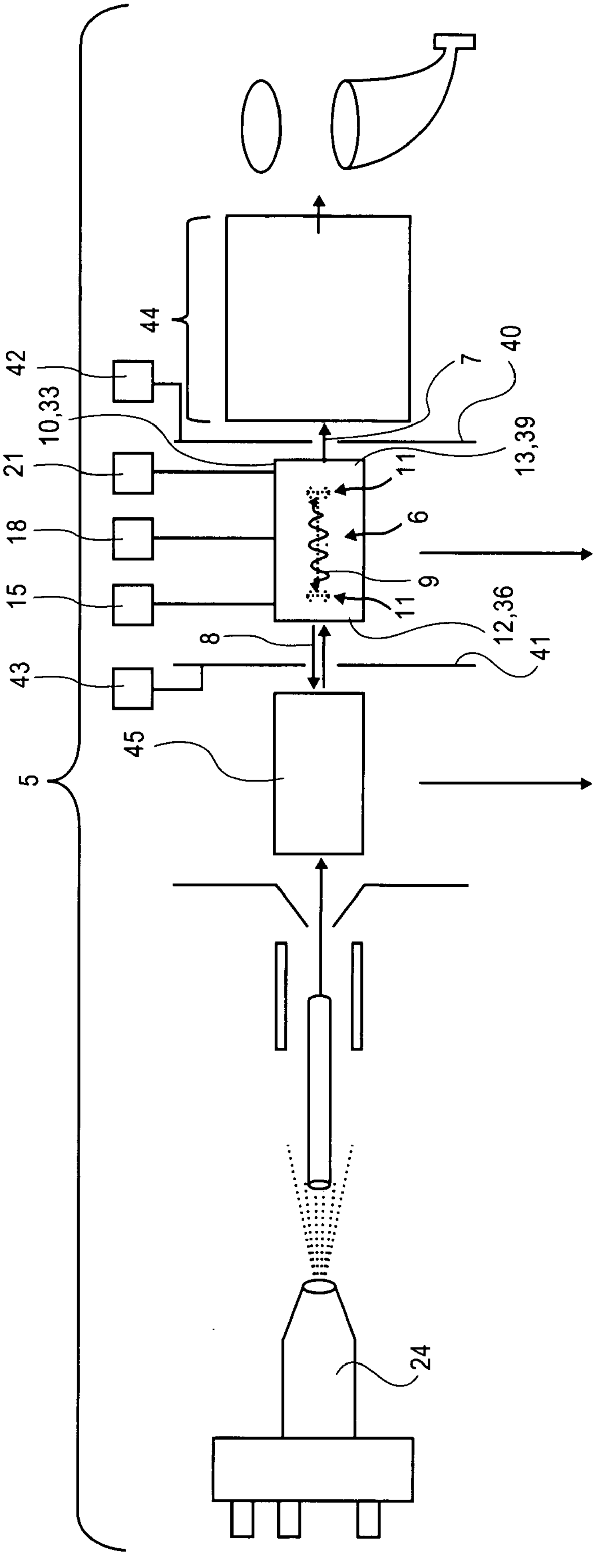
FIG. 1 is a diagrammatic view of a mass spectrometer in which a multipole device in accordance with embodiments of the present invention may be incorporated.

It is to be understood that the multipole device 10 schematically shown in FIG. 1 may be implemented in any of a variety of applications including, but not limited to: one) ion trapping applications; two) "all-ions" mass analysis techniques; and three) collisional multipole applications.

With reference to FIG. 1, when the multipole 10 is operated as an ion trap, element 45 upstream in the spectrometer 5 may simply be an ion guide or a mass filter, for example. When the multipole device 10 is a linear trap formed of a plurality of rod electrodes, these rod electrodes may be segmented and ions may be stored mass selectively in different sections of the linear trap. When desired, ions of only one m/z or a range of m/z may be stored in the multipole 10 operated as a linear trap without risk of spilling the ions out the ends of the multipole 10. With the multipole device 10 in the trapping mode, the spectrometer 5 may have one or more of another ion trap analyzer, a time-of-flight (TOF) analyzer, any other analyzer, other ion optics, and a detector downstream of the multipole device 10 as represented by element 44 and the rest of the spectrometer 5 shown in FIG. 1.

When operated in an "all ions" mode, mass isolation such as by collision induced dissociation should be implemented upstream. Hence, element 45 in FIG. 1 may represent a collision cell for fragmenting ions prior to entry into the multipole device 10. In accordance with embodiments of the present invention, the multipole device 10 has increased ability to hold, move, and scan out ions of a large range of m/z as may occur in the "all ions" applications. From the multipole device 10 operated in the "all ions" mode, the ions may be ejected into one or more of a detector, additional ion optics, and other analyzers as represented by element 44 and the rest of the spectrometer 5 of FIG. 1.

The multipole device 10 may be operated as a collisional multipole. Once again, element 45 located immediately upstream may be an ion guide or filter. Alternatively, element 45 could be another analyzer by which preliminary information is gathered. Downstream from the multipole 10 operated as a collision cell, the spectrometer may have one or more of, additional ion optics, a time-of-flight (TOF) analyzer, an ion trap, another analyzer, and a detector as represented by element 44 and the rest of the spectrometer 5. Combining the multipole 10 as a collision cell with a TOF or other analyzer in this manner can improve duty cycle.

It is to be understood that the multipole device 10 may be mixed and matched in any combination of modes of operation. Alternatively, the modes of operation may be switched as needed during use or between uses. Furthermore, the ions may be moved in either direction from the multipole device 10 into another element of the spectrometer 5.

The embodiments of the present invention are directed to an apparatus and method for ejecting ions of a specific m/z ratio or range of ratios from a multipole device 10 of a mass spectrometer 5, an example of which is illustrated schematically in FIG. 1. Greater selectability for axial separation and movement of ions is made possible by starting separation before an end of the multipole device. In fact, ions can be separated based on their m/z ratio along substantially an entire length of the multipole device.

For purposes of this disclosure, the term balanced as it relates to the axial DC voltage gradients and the DC fields that they create refers to the DC voltage gradient in one pair of diametrically opposite pair of rod electrodes in a first plane being opposite to the DC voltage gradient in another pair of diametrically opposite pair of rod electrodes in a second plane that is transverse to the first plane. The term balanced with regard to the DC fields that are created by the axial DC voltage gradients in one configuration means that the DC fields approach or add to zero on the central axis. Generally, the first and second planes intersect on the central axis to give a net of substantially zero such that there are no net radial or axial forces from the DC fields created by the axial DC voltage gradients. The term balanced applied to configurations that create a net axial bias by an overall axial DC gradient means that at the central axis there are few or no net radial forces from the DC fields and only minor axial forces created by the axial DC voltage gradients even though there is a predetermined net axial force. Thus, ions in a balanced multipole system of this type that have not been excited will remain on the central axis of the multipole whether they be biased by a net biasing axial DC voltage to an end thereof or not. As ions move radially off the central axis they generally enter unbalanced regions of the DC fields.

In a simple form, the embodiments of the present invention include an apparatus and method for ejecting ions 6 axially as indicated by arrows 7 and 8 by resonantly exciting the ions 6 along a path 9. That is, the ions 6 are excited radially away from a central axis of a multipole device 10 into an unbalanced region of a composite axial DC field, resulting in net axial motion of the ions 6. The trajectories of the excited ions extend radially outwardly and enter the unbalanced region of the axial DC field to predetermined extents. These extents correspond to a radial location at which the DC field moves the excited ions axially into at least one of regions 11 at ends 12, 13 of the multipole device 10 and then out at least one of the ends 12, 13 of the multipole device 10 to other ion optical elements in a controlled manner.

In particular, DC voltages are applied to the multipole rod electrodes in a manner that creates a composite DC field having a zero DC field in the axial direction at the central axis of the multipole 10. Thus, as long as the ions are at or near the central axis they experience little or no force from the axial DC field of the rod electrodes. The composite DC field is said to be balanced about the central axis. However, increasing radial positions relative to the central axis are generally in increasingly unbalanced regions of the composite DC field. These unbalanced regions have axial DC fields that are biased in one axial direction or the other. Therefore, the unbalanced DC field in the regions that are radially spaced from the central axis causes movement of the ions in one axial direction or the other.

In accordance with embodiments of the present invention, the ions 6, (which may represent the preselected ions), are moved away from the central axis by an electrical field set up by one or more auxiliary RF voltages or excitation voltages in combination with a main RF voltage each applied to a set of rod electrodes. As shown in FIG. 1, a main RF field is created by applying a main RF voltage from a main RF voltage source 15. The auxiliary RF voltages are applied by an auxiliary RF voltage source 18. Application of the auxiliary RF voltages is indicated by AC labels throughout the Figures since RF is more commonly associated with main RF voltages used for confining ions radially. Although the auxiliary voltages will typically be applied in the radio frequency (RF) range of frequencies, the excitation voltages could be applied at other alternating current (AC) frequencies outside the RF range. The composite DC field is created by one or more DC voltages from a DC voltage source 21.

In some embodiments, it is desirable to fill the multipole device 10, which may take the form of an ion trap or other mass analyzer, to a greater extent with the ions 6 in a controllable way, and in a way that decouples the ions 6 from the mass distribution originated in an ion source 24. That is, allowing ions to be spread over substantially a whole length of the multipole device 10 and applying the mechanism of the present invention instead of using fringing fields can reduce space charge effects and allow more ions to be stored. Because the ions are manipulated along a whole length of the multipole, a higher charge capacity/mass capacity mass analyzer can be achieved than with analyzers that depend on manipulation of the ions in the limited regions of the fringing fields. The multipole device 10 also enables a distribution of the ions 6 that does not necessarily correspond with the order in which the ions were introduced into the ion optics. Filling the trap or analyzer 10 in this way includes causing a natural ion drift toward one or both ends 12, 13 of the multipole 10.

Figure 2:
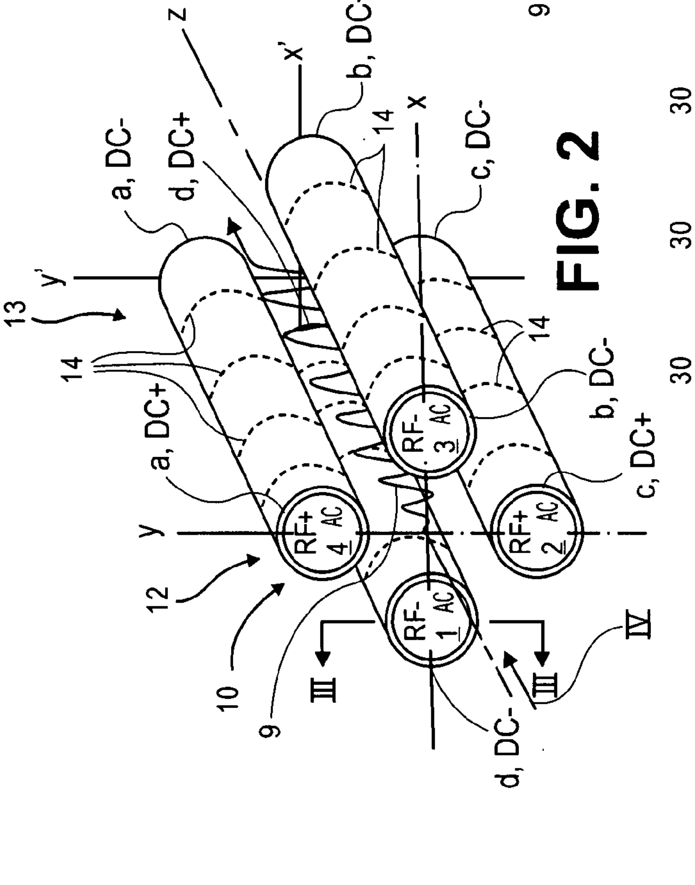
FIG. 2 is a diagrammatic perspective view of a multipole device in accordance with the present invention.

To this end, as shown in FIG. 2, a main RF voltage is applied to a plurality of rod electrodes 1, 2, 3, 4 of the multipole device 10 for conventional RF only operation. An auxiliary RF voltage is applied to these rods 1, 2, 3, 4 to resonantly excite ions of predetermined m/z away from a central axis z of the multipole 10, as indicated by the oscillating path 9. It is to be understood that for ejection of ions in only one axial direction, only one pair of diametrically opposed rod electrodes needs to have an excitation voltage applied for the embodiment of FIG. 2. Axial DC voltage gradients are applied to the rod electrodes 1, 2, 3, 4 to create axial DC fields or a composite DC field that causes ion drift generally along the central axis z toward ends 12, 13 of the multipole device 10 for ions having radial excursions off the central axis z. For ions that are not excited off the central axis z, no net drift will be experienced.

Figure 4:
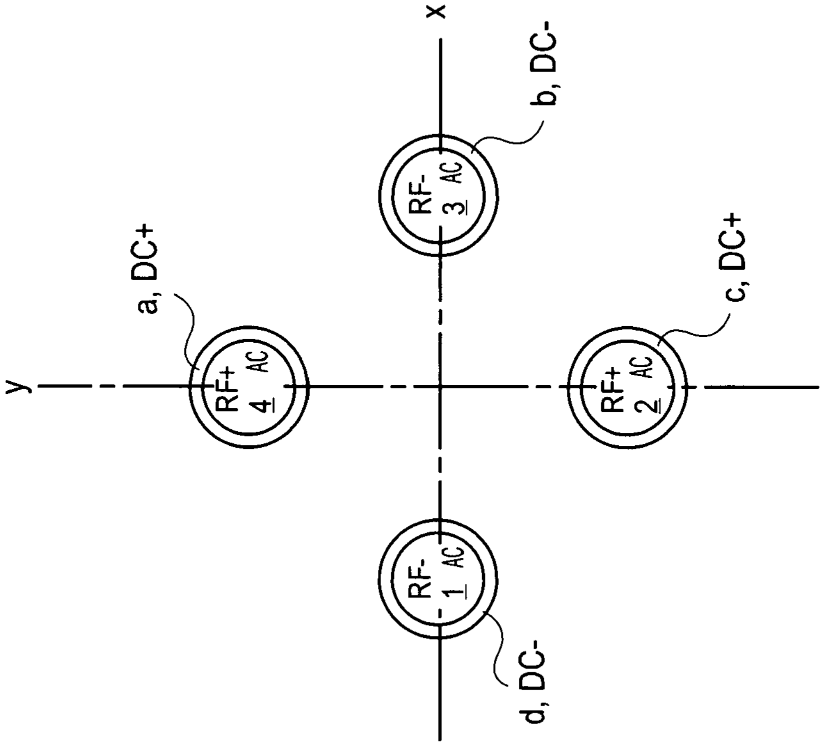
FIG. 4 is a diagrammatic end view taken in a direction of arrow IV of the multipole of FIG. 2.

The DC field may be created by one or more DC voltage gradients in the axial direction such as by the RF rods 1, 2, 3, 4 having an insulative layer, and resistive coatings or windings a, b, c, d, which create resistive paths. Alternatively, the DC voltage gradients could be applied to segmented RF or segmented auxiliary DC rods, as indicated by the dashed lines 14. Further alternatively, shaped, tapered, or slanted rods may be used to provide the needed gradients. (See for example, U.S. Pat. Nos. 5,679,950, 5,783,824 to Baba et al.; U.S. Pat. Nos. 5,847,386, 6,111,250 to Tompson et al.; and U.S. Pat. No. 6,163,032 to Rockwood.) In the illustrated embodiment of FIG. 2, a first pair of diametrically opposed rods 2, 4 with resistive paths a, c each having the same first DC voltage gradient may also be a pair of opposed RF rods. A second pair of diametrically opposed rods 1, 3 with resistive paths b, d each having the same second DC voltage gradient may also be a pair of opposed RF rods. Each rod of the second pair 1, 3 can have the second DC voltage gradient that is opposite to the first DC voltage gradient of the first pair 2, 4. As shown in FIGS. 2 and 4, the first pair of rods 2, 4 and second pair of rods 1, 3 lie in planes y, x that are transverse relative to each other. The planes y, x intersect on the central axis z of the multipole device 10.

The DC voltage gradients may be selected such that ions on the central axis experience little or no net force due to the resultant DC fields. Thus, according to methods of the present invention, ions are generally cooled down in the multipole 10 before excitation is applied. Otherwise, differences in initial conditions will affect axial distribution of the ions and cause a loss in selectivity. On the other hand, ions moving off the central axis z due to subsequent excitation will experience a force toward one end of the multipole device 10 or the other depending on where in the x-y plane the ion trajectory is located. The field created by the excitation voltage is added to the main RF field and causes ion motion predominantly in the plane where one direction of the composite DC field dominates over the other. That is, the ions will experience a force toward one end or the other depending on whether the ions are closer to the plane y of the first pair of DC rods or the plane x of the second pair of DC rods. By selectively exciting the ions off the central axis z and toward one plane or the other, selective ion drift may be effectuated. Thus, ions may be separated axially within the multipole device 10 based on their m/z ratios. In fact, an auxiliary RF voltage may be applied to the multipole device 10 for double excitation of ions having a first m/z into one plane and ions having a second m/z into another plane. Alternatively, ions of a particular target m/z or range of m/z could be moved to a first end, and all ions except for the particular target m/z or range of m/z could be moved to a second end. A small bias may be applied through the DC voltages, as will be described with regard to FIG. 10 below. Even when initial ion drift is caused by a small bias, dominant excursion of the ions in one of the axial directions can be caused by exciting the ions radially outwardly into regions where the DC field is predominant in one of the axial directions.

This mechanism for moving ions within the mulitpole device 10 is very effective because it diminishes the influence between the ions being moved and the ions remaining on the central axis. With reference to FIG. 1, it can be seen that excitation of the preselected ions moves them off the busy central axis into regions that are less influenced by other ions. Thus, the preselected ions may be moved axially through uncongested regions toward an end of the multipole device 10. As a number of preselected ions located at an end increases, other non-preselected ions that are on the central axis will naturally move to accommodate the preselected ions such that a spreading redistribution takes place. As the ions spread out again the likelihood of negative space charge effects is lessened.

Figure 3:
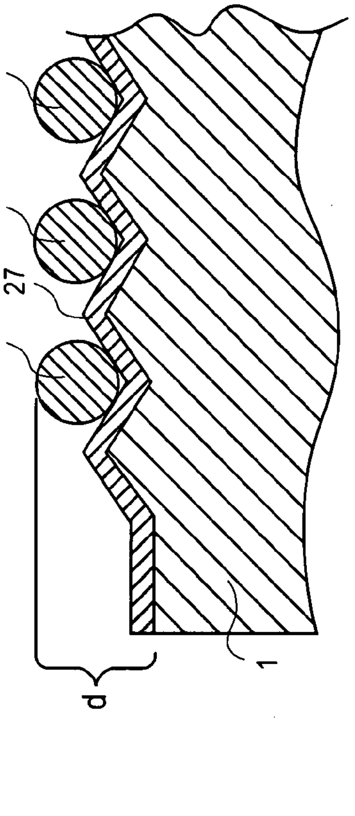
FIG. 3 is a sectional view taken along line III-III of FIG. 2.

FIG. 3 shows an example of a resistive coating or winding d that forms a resistive path, which may be applied to a rod 1 in accordance with one embodiment of elements used to create DC gradients on rods. As shown, an insulative layer 27 may be applied to the rod 1 and a winding of a resistive filament 30 may be added as a coating or outer shell to form a resistive path. Alternatively, an intermittent resistive layer could be applied. The other rods 2, 3, 4 may be coated, layered, and/or wound similarly. Alternatively, DC gradients may be created in other known ways including, but not limited to, the use of alternative or additional segmented DC and/or segmented RF rods.

Figure 5:
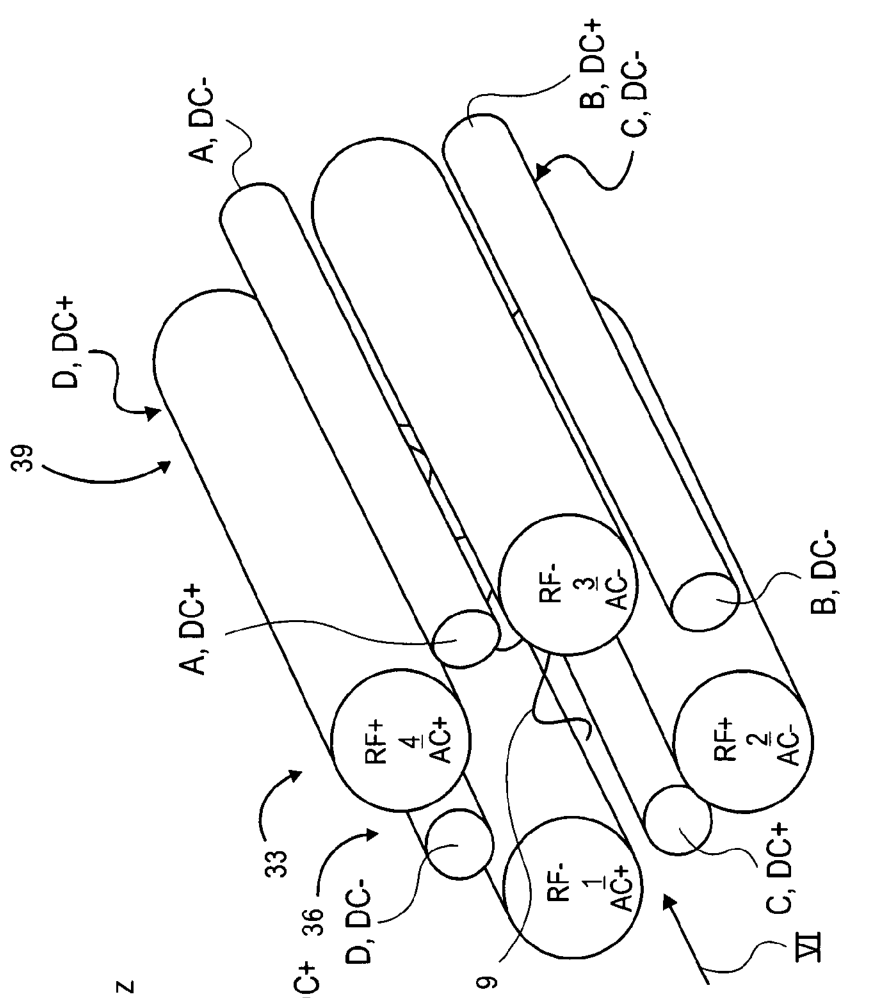
FIG. 5 is a diagrammatic perspective view of a multipole device in accordance with another embodiment of the present invention.

FIG. 5 is a diagrammatic perspective view of another embodiment of a multipole device 33 in accordance with the present invention, in which elements similar to those of FIGS. 2-4 are numbered similarly. A main RF voltage is applied to the plurality of rod electrodes 1, 2, 3, 4 of a multipole device 33 for conventional RF only operation. An auxiliary RF voltage is applied to these rods 1, 2, 3, 4 to resonantly excite ions of predetermined m/z ratio away from the central axis z of the multipole device 33, as indicated by the oscillating path 9 similar to the embodiment shown and described with regard to FIGS. 2-4 above. However, axial DC voltage gradients are applied to separate DC rod electrodes A, B, C, D to create axial DC fields and cause ion drift toward ends 36, 39 of the multipole device 33.

Figure 6:
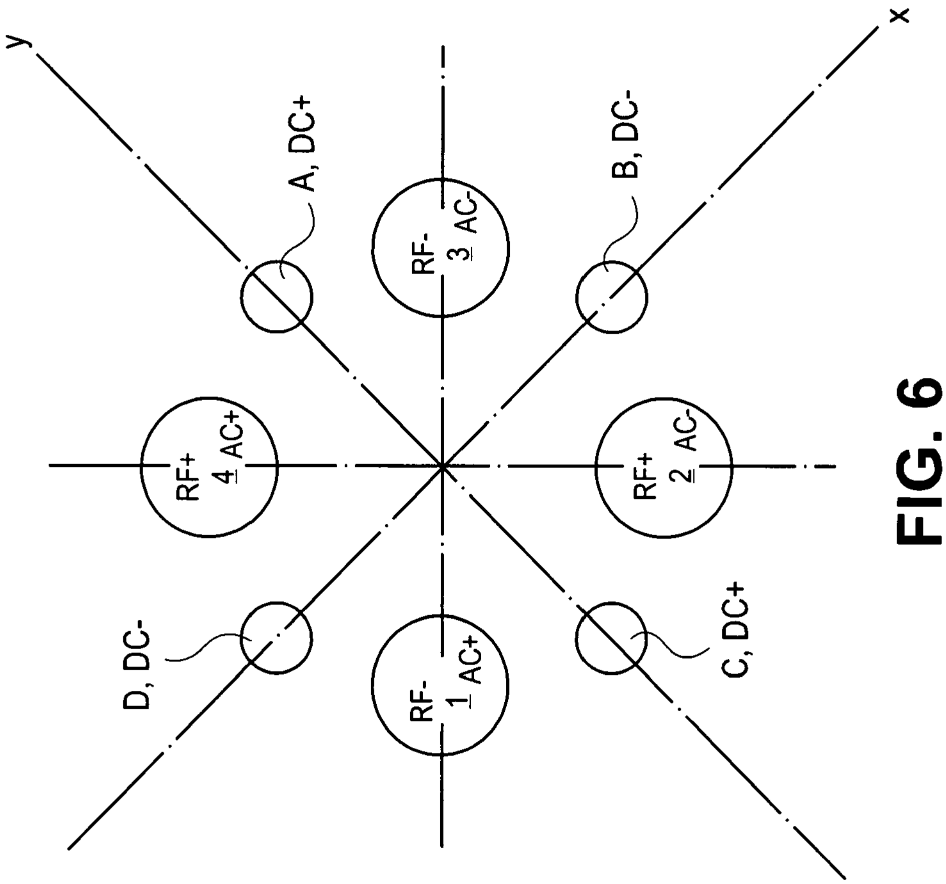
FIG. 6 is a diagrammatic end view taken in a direction of arrow VI of the multipole device of FIG. 5.

The DC fields may be created by applying DC voltage gradients in the separate DC rods A, B, C, D in the axial direction. The rods A, B, C, D may be provided with a DC voltage gradient along their lengths by segments, resistive coatings, or resistive paths as has been described above. A first pair of diametrically opposed DC rods A and C each having the same DC voltage gradient may be placed between adjacent ones of the RF rods 3, 4 and 1, 2, respectively, as shown in FIGS. 5 and 6. The multipole device 33 has a second pair of DC rods B and D in which each rod of the second pair has an opposite DC voltage gradient relative to the gradient in the first pair of DC rods A and C. Each rod of the second pair of DC rod electrodes B and D is placed between adjacent ones of RF rod electrodes 2, 3 and 4, 1, respectively, such that the first pair A, C and the second pair B, D of DC rods lie in respective transverse planes y and x relative to each other, as shown in the end view of FIG. 6. The planes y and x intersect on the central axis z of the multipole device 33, as shown in FIG. 6. The DC voltage gradients may be selected such that ions on the central axis z may experience little or no net force due to the DC fields. That is, the DC fields may substantially add to or approach zero on the z-axis. However, ions moving off the central axis z will experience a force toward one end 36 of the multipole device 33 or the other end 39, depending on whether the ions are closer to the plane y of the first pair of DC rods A, C or the plane x of the second pair of DC rods B, D. By selectively exciting the ions off the central axis and toward one plane or the other, selective ion drift may be effectuated. Thus, ions may be separated axially within the multipole device 33 based on their m/z ratios. The DC voltages may be selected to set up a bias on the central axis to urge ions toward one end of the multipole device 33 or the other, as will be described with regard to FIG. 10 below.

Referring to FIGS. 5 and 6, it is to be understood that the auxiliary RF or excitation voltage will be applied such that two of the RF rod electrodes, for example 1 and 4, will have first excitation voltages, which may be the same as each other. As a result, ions are urged diagonally in the plane x defined by DC rod electrodes B and D where the DC field created from the DC voltages of rod electrodes B and D dominates. In this example, RF rod electrodes 2 and 3 can each have a second excitation voltage that is opposite to the voltages of the rod electrodes 1 and 4 to increase the excitation field created in the diagonal direction along the plane x. Additionally or alternatively, RF rod electrodes 3 and 4 can each have a third excitation voltage that is the same as each other applied while RF rods 1 and 2 can have a fourth excitation voltage that is opposite to the third excitation voltage for urging ions in a plane y of DC rods A and C. As described herein, the auxiliary or excitation voltages can be selected to move ions of a first m/z ratio off the central axis in a first plane y for causing ion drift in a first axial direction, and to move ions of a second m/z ratio off the central axis in a second plane x transverse to the first plane y for causing ion drift in a second axial direction opposite to the first direction. In a specific variation of this method, the excitation voltages can be selected to move all but the ions of first m/z or range of m/z off the central axis in the second plane x and cause the ion drift opposite to that of the first ions.

After the ions have acquired energy from electrical field created by the auxiliary or excitation voltage(s) to experience radial excursion into dominant regions of the composite axial DC field, and after the ions are axially separated by the drift caused by the axial DC field, then the excited ions will be located generally at ends 12, 13 or 36, 39 of a multipole device 10, 33. The rest of the ions will generally move to accommodate the excited ions at the end(s) of the multipole device 10. The auxiliary RF voltage can be manipulated to further increase the energy of ions having a predetermined m/z ratio. When the ions are thus further energized, they are also moved further from the central axis z and into regions of greater influence from the axial DC fields forming the composite axial DC field. Trajectories of the excited ions have greater extents in a radial direction when further energized such that the excited ions move into regions where the axial DC fields are even more dominant. Thus, these ions can overcome any inherent fringing field and/or an axial barrier 40, 41 that may be placed to separate the ions from a next element 44, 45 of the ion optics in the mass spectrometer 5, as may be appreciated from the example illustrated in FIG. 1.

The axial barriers 40, 41 are shown as ion lenses to which barrier voltage sources 42, 43 are coupled. Other axial barrier structures are also possible. For example, segments of the multipole devices 10, 33 may have barrier voltages applied near their ends 12, 13 or 36, 39. Alternatively, a ring electrode may be placed to generally surround the rod electrodes at one or both of the ends 12, 13 or 36, 39. Ions of selected m/z can be excited radially off the central axis a predetermined distance by the excitation voltage to an extent that depends on the axial field needed for ejection of the ions past axial barriers 40, 41, for example. The ions of the selected m/z are then ejected past one of the axial barriers 40, 41 by accelerating the ions to a predetermined potential by the DC field at the predetermined radial distance.

The next element 44, 45 of the ion optics could be an ion storage device, a transfer device, a collision cell, or a mass analyzer. The rest of the ions that have resonances other than the excitation resonance will not have enough energy to move into the regions of the DC fields that would cause them to pass the barriers 40, 41, and thus the rest of the ions will remain in the multipole device 10 or the multipole device 33 until they are selectively energized in a similar manner. To energize the ions, at least one of a magnitude of the main RF voltage and a frequency of the excitation voltage can be varied to mass selectively increase trajectories of the ions to a predetermined degree such that the ions are mass selectively ejected axially by the composite axial DC field. The mass selective ejection may include any ejection that is controlled on the basis of mass or m/z including mass-sequential ejection. The magnitude of the main RF voltage and/or the frequency of the excitation voltage may be varied by a scan such that the ions come into resonance in m/z order.

It is contemplated that two or more multipole devices 10, 33 in accordance with embodiments of the present invention may be coupled with another element 44 downstream, which may include one or more of a storage device, an analyzer, an additional ion optical element, another device, and combinations thereof in the ion optics of a mass spectrometer. Thus, ion mobility and analysis options may be enhanced. Ions could actually be delivered to and/or received from the storage device 44 in both directions to and from multipole devices 10, 33. In one configuration, a plurality of multipole devices 10, 33 may straddle the storage device 44, for example. Additional multipole devices 10, 33 may be added without limitation such that a star configuration that feeds ions from multiple multipole devices 10, 33 into the storage device 44 is provided. Alternatively, a multipole device 10, 33 in accordance with the present invention could receive ions from multiple other elements 44 including one or more of storage devices, guides, collision cells, or other analyzers into the multipole device 10, 33. The storage device as represented in FIG. 1 as element 44 may also be an analyzer such as an ion trap, for example.

In another embodiment the auxiliary RF voltage may be applied to the ions through the DC rod electrodes A, B, C, and D shown in FIGS. 5 and 6, for example, instead of through the main RF rod electrodes 1, 2, 3, 4. Applying the auxiliary RF voltage through the DC rods in this way has the advantage of causing a more direct excitation within the planes x and y of a pair of opposing DC rods.

Figure 7:
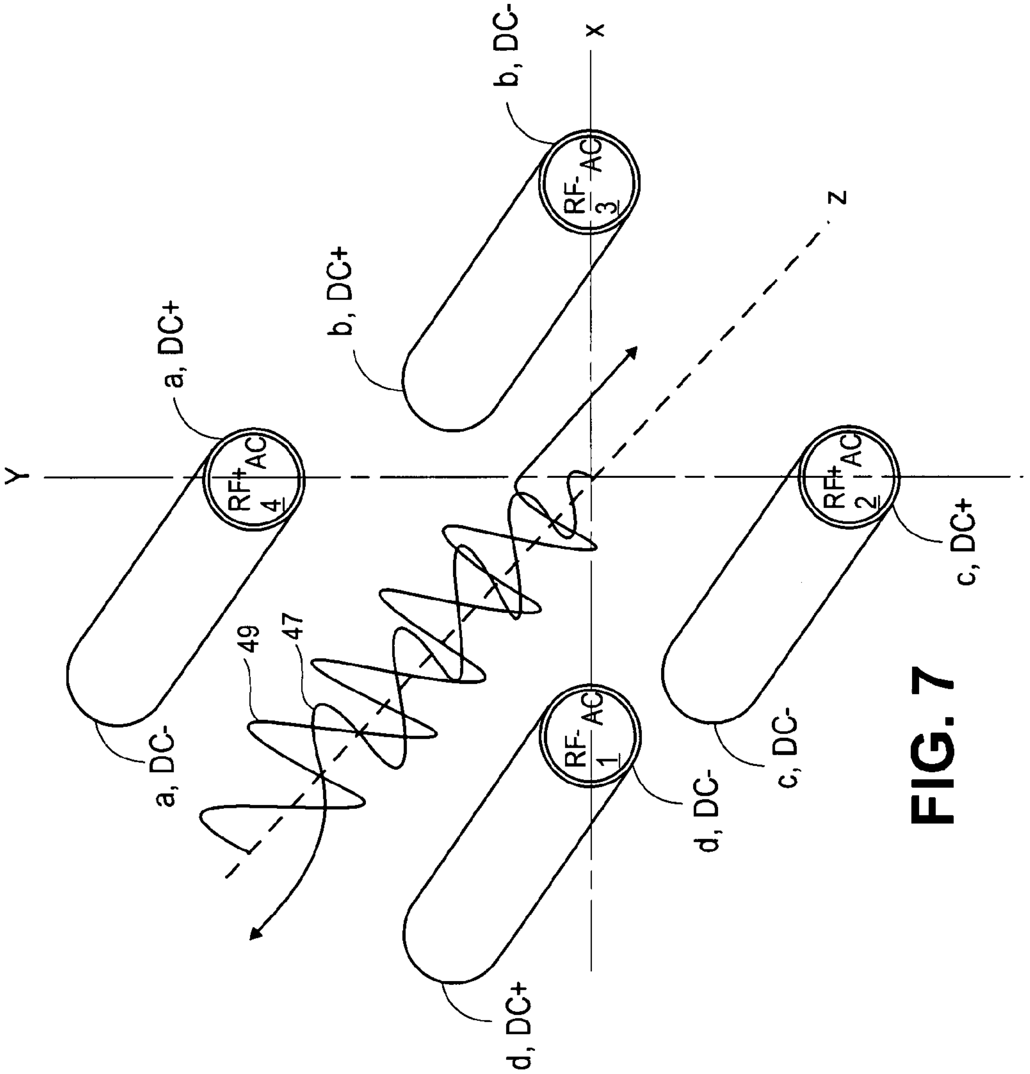
FIG. 7 is an exploded view of the multipole device of FIGS. 2 and 4 showing ion paths having trajectories predominantly in the x and y planes.

FIG. 7 shows an exploded diagrammatic view of the multipole device 10 of FIGS. 2-4 in order to illustrate how the excitation voltages indicated by AC labels can be used to move ions into either one or both of the plane x and plane y as indicated by ion paths 47, 49. In embodiments in which it is desired to cause drift and ejection only in one axial direction, an axial DC voltage gradient can be applied to only one pair of diametrically opposed rod electrodes. However, this would cause drift of all the ions present in the multipole device 10 because there would be no canceling effect of an opposite axial DC field on the central axis. On the other hand, two opposite axial DC voltage gradients may be applied, as has been described herein, such that the DC fields that they create in the planes x and y dominate and urge ions of the same sign in opposite axial directions at radial excursions greater than a predetermined magnitude. Thus, the combination of main RF voltages, auxiliary or excitation voltages, and DC voltages to each rod of the set of rod electrodes 1, 2, 3, and 4 can provide a very direct way to implement the axial drift and ejection of ions in accordance with the present invention.

Figure 8:
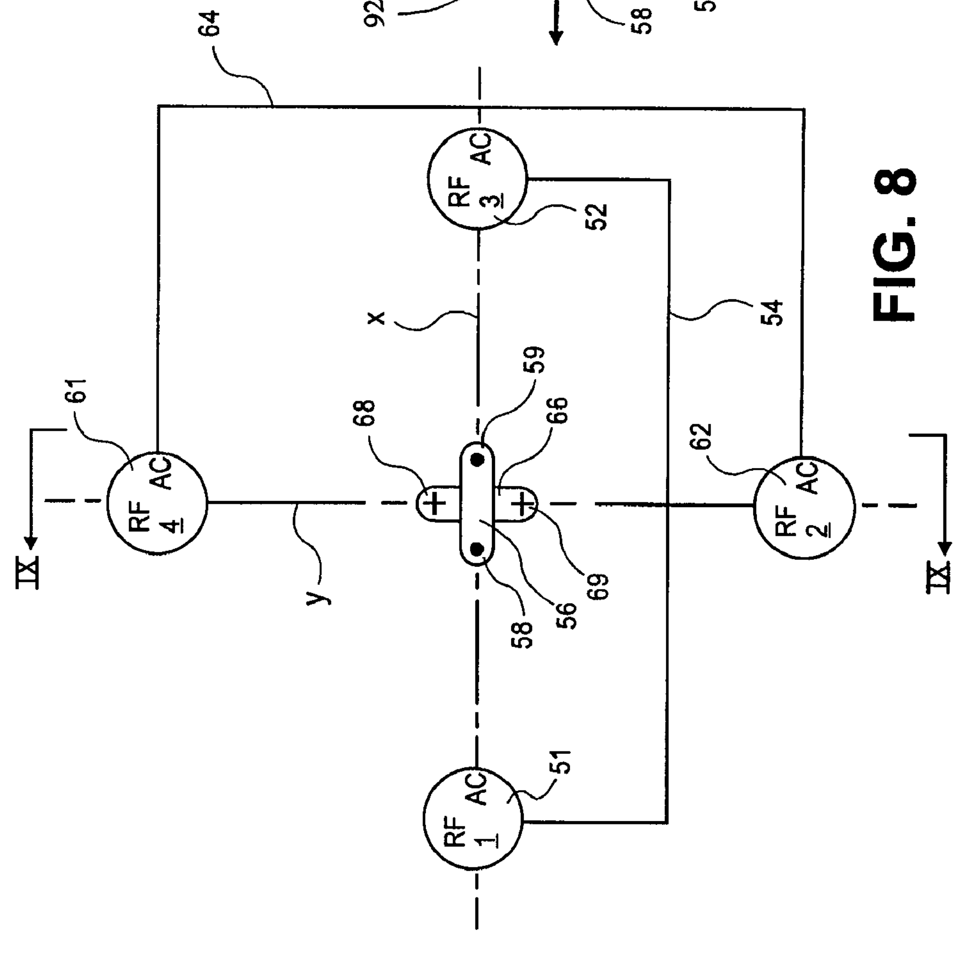
FIG. 8 is a schematic end view of a multipole showing how the excitation voltages can be applied to opposite rods.

By way of further explanation with regard to the ion excursion, ion drift, and ion ejection, FIG. 8 shows a schematic end view of a multipole, which could represent multipole 10, 33, or some other multipole. In addition to the main RF and DC voltages, a first auxiliary AC or RF voltage may be applied to opposite rod electrodes 51, 52 as indicated by a connector 54. By adjusting a frequency and/or magnitude of at least one of the auxiliary voltage and the main RF voltage, ions of a particular m/z can be excited off the central axis z and into the plane x defined by the rod electrodes 51, 52. The auxiliary voltage causes the ions to move off the central axis z in a generally planar excursion 56. Then axial DC fields can cause axial drift of the excited ions. Excited ions having trajectories with sufficient extents away from the central axis z along the plane x are ejected in a first direction out of the page by the axial DC field, as indicated by arrow points 58, 59. To achieve ejection, the ions must be excited sufficiently to have trajectory extents away from the central axis z to a position where the axial DC field in the first direction is dominant.

Similarly, a second auxiliary AC or RF voltage may be applied to opposite rod electrodes 61, 62 as indicated by a connector 64. By adjusting a frequency and/or magnitude of at least one of the auxiliary voltage and the main RF voltage, ions of a particular m/z can be excited off the central axis z and into the plane y defined by the rod electrodes 61, 62. The auxiliary voltage causes the ions to move in a generally planar excursion 66. An axial DC field can then cause drift of the excited ions having trajectories with sufficient extents away from the central axis z, as has been described. Excited ions are ejected in a second direction corresponding to a direction into the page under the influence of the DC field created by the rod electrodes 61, 62, as indicated by arrow tails 68, 69 when the ions are excited sufficiently to have trajectory extents away from the central axis z to a position where the axial DC field in the second direction is dominant.

Figure 9:
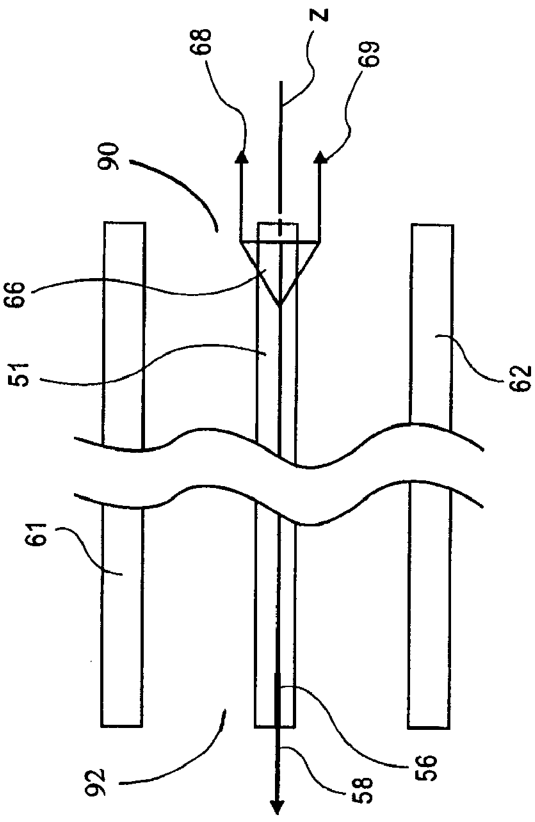
FIG. 9 is a sectional side view of the multipole taken along line IX-IX of FIG. 8 showing how ions are moved off the axis and potentially ejected in opposite directions.

FIG. 9 is a sectional side view taken along line IX-IX of FIG. 8. The planar excursion 66 in the plane y is shown as a triangular region in FIG. 9, although the planar excursion could sweep out a region of any shape and it is to be understood that ions are excited off the central axis z along substantially an entire length of the multipole device. The region 66 corresponds to formation of ion clouds extending a radial distance from the central axis z. The planar excursion 56 in the x plane is shown as a bolded region on the central axis z. As shown in FIG. 9, in one embodiment, first ions of a first m/z ratio can be excited to resonate in the plane y by the excitation voltage applied to rod electrodes 61 and 62. The first ions can be ejected in the first direction by the electrical field created by a first axial DC voltage gradient, as indicated by arrows 68, 69. Second ions of a second m/z ratio can be excited at a second resonance and thus caused to have an increased trajectory into the plane x. The second ions can be ejected in the second direction, as indicated by arrow 58, by the DC field created by a second axial DC voltage gradient.

By way of example, moving ions in opposite axial directions may be utilized to move a large range of ions (substantially all) of unwanted m/z values to the second end, and to move the ions of a desired m/z or range of m/z to the first end of the multipole. This may be achieved by applying the auxiliary voltages by respective tailored excitation wave forms to first and second transverse pairs of opposite rod electrodes. The second wave form may include a wide range of multiple frequencies forming a single (or plural notches) about one or more m/z values or range(s) of values that are being targeted for separation, movement, and/or analysis. The first wave form may include the frequency or frequencies that will resonantly excite the target ion or range of ions. The second wave form can be configured to excite the ions of unwanted m/z into or near a second plane for urging by one of the DC fields in the second direction toward the second end. The first wave form can be configured to excite the targeted ions into or near a first plane where they are urged in the first direction toward the first end.

It is to be understood that a first axial DC voltage creates a first axial DC field that causes the ion drift for ions that spend more time closer to a corresponding first plane (plane y, for example) after the ion excursion off the central axis z has been caused by the auxiliary or excitation voltage, which may be an RF voltage. A second axial DC voltage creates a second axial DC field that causes the ion drift for ions that spend more time closer to the second plane (plane x, for example) after the ion excursion. (See FIG. 9.) It is to be understood that the first and second axial DC fields may be considered a single composite axial DC field since the first and second DC fields generally merge and create an additive composite DC field. A front end storage region 90 may be formed and correspond to a volume in a front end of the multipole device in which ions of a first predetermined m/z or range of m/z ratios reside after ion drift has been caused by the first axial DC field in the first plane y, for example. Similarly, a back end storage region 92 may be formed and may correspond to a volume in a back end of the multipole device in which ions of a second predetermined m/z or range of m/z ratios reside after ion drift has been caused by the second axial DC field in the second plane x, for example. Each time ions are moved into an end storage region 90, 92, the remaining ions will naturally move to make room due to the influence of the ions on each other. Multiple iterations of moving and storing ions of different m/z ratios may be implemented with or without steps of ejecting the preselected ions between iterations. Additionally, ions of predetermined m/z may be locked in a particular portion of the multipole by applying one or more trapping potential. Trapping potentials may be applied in any of a variety of ways including by segments on auxiliary rods or on the main RF rods, for example. Thus, ions may be spread along an entire length of the multipole device and a maximum quantity of ions may be stored in the multipole device. Even with only one or two iterations, with or without trapping potentials applied, separating the ions and storing them in at least one of the front end region and the back end region by the mechanism of the present invention allows handling of larger populations of ions because of the pattern of movement, as described above.

Another advantage to separation of the ions and storage in front and back ends in this manner is that ions of a particular m/z ratio or range of m/z ratios may be selected based on their m/z and moved into the next ion optical element for analysis, separation, or fragmentation without the adverse effects of space charge effects, for example.

Additional DC fields that are dominant in respective planes could be created by applying additional DC voltage gradients in respective rod electrode pairs for further separation of ions having additional m/z ratios or ranges of ratios. Thus, a multitude of ion clouds could be circumferentially spaced about a central axis z, for a further increased storage capacity in the multipole device. Respective excitation voltages could be applied to resonantly excite ions of predetermined m/z into the desired planes for causing drift to a desired end or other position within the multipole device. This and the use of multiple multipole devices in a mass spectrometer provides limitless opportunities for ion mobility and analysis in which ions can be transported back and forth between any number of analyzers, collision/fragmentation chambers, traps, and/or guides for example.

A mass spectrometer 5 in accordance with embodiments of the present invention may simply include a multipole device 10, 33 such as those shown in FIGS. 2-10 having a main RF voltage applied to create an RF field for radially containing ions within the multipole device 10, 33 such that the multipole device 10 functions as an ion trap. The multipole device 10, 33 may have at least one of a first axial DC voltage gradient creating an axial DC field in a first direction along a length of the multipole device 10, 33 and a second axial DC voltage gradient creating a second axial DC field in a second direction opposite the first direction along the length of the multipole device 10, 33. The first and second axial DC fields may approach or substantially add to zero on the central axis z. The multipole device 10, 33 may have an excitation voltage of any kind for selectively exciting the ions off the central longitudinal axis z of the multipole device 10, 33. The excitation voltage may thus cause an excursion of the ions away from the central axis z and into a region where either the first or the second axial DC field is strong enough to cause ion drift toward a front end 12, 36 or a back end 13, 39 of the multipole device 10, 33.

Figure 10:
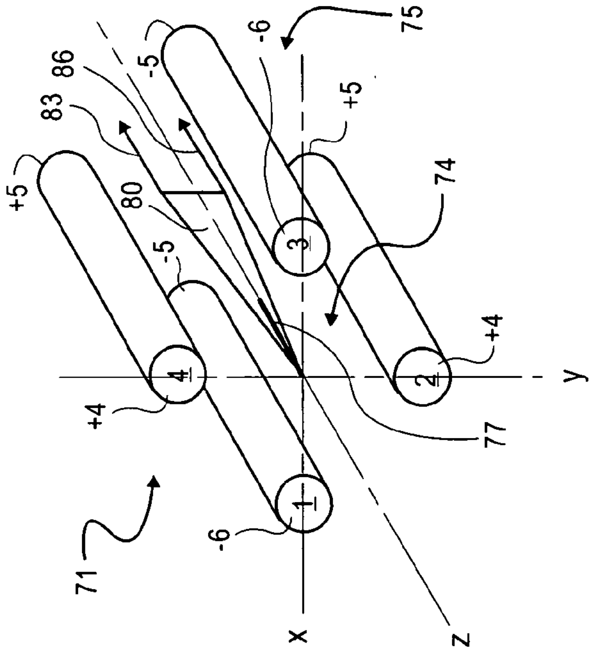
FIG. 10 is a diagrammatic view of rod electrodes to which opposite voltages are applied with a small axial bias.

FIG. 10 shows a diagrammatic view of the rod electrodes 1, 2, 3, 4 of a multipole device 71 similar to the embodiment of FIGS. 2-4, for example. In many of the embodiments it is desirable to establish the opposite DC voltage gradients such that the DC fields that they create approach or add substantially to zero on the central axis z. However, the embodiment of the multipole device 71 of FIG. 10 shows a small axial DC bias applied in which a lower potential exists at a front end 74 of the multipole device 71 than at a back end 75. This bias may be selected and applied at a sufficiently low level that the multipole device will be considered to be an “RF only” multipole device. That is, its operation is like that of an “RF only” device. In multipole devices having even a small axial bias, positive ions for example, on the central axis will drift or be attracted toward the front end 74 as indicated by the bolded line 77 on the central axis. Then, the ions can be excited by an excitation voltage and caused to have trajectories into the plane y to extents at which the axial DC field toward the back end 75 dominates. The excited ions are caused to drift as indicated by the planar drift 80, and/or to be ejected as indicated by arrows 83, 86.

FIG. 10 shows a diagrammatic view of the DC rod electrodes A, B, C, D of a multipole device 71 in a variation of the embodiment of FIGS. 5 and 6, for example. In many of the embodiments it is desirable to establish the opposite DC voltage gradients such that the DC fields that they create approach or add substantially to zero on the central axis z. However, the embodiment of the multipole device 71 of FIG. 10 shows a small bias applied in which a lower potential exists at a front end 74 of the multipole device 71 than at a back end 75. This bias may be selected and applied at a sufficiently low level that the multipole device will be considered to be an "RF only" multipole device. That is, its operation is like that of an "RF only" device. In multipole devices having even a small axial bias, positive ions for example, on the central axis will drift or be attracted toward the front end 74 as indicated by the bolded line 77 on the central axis. Then, the ions can be excited by an excitation voltage and caused to have trajectories into the plane y to extents at which the axial DC field toward the back end 75 dominates. The excited ions are caused to drift as indicated by the planar drift 80, and/or to be ejected as indicated by arrows 83, 86.

Figure 11:
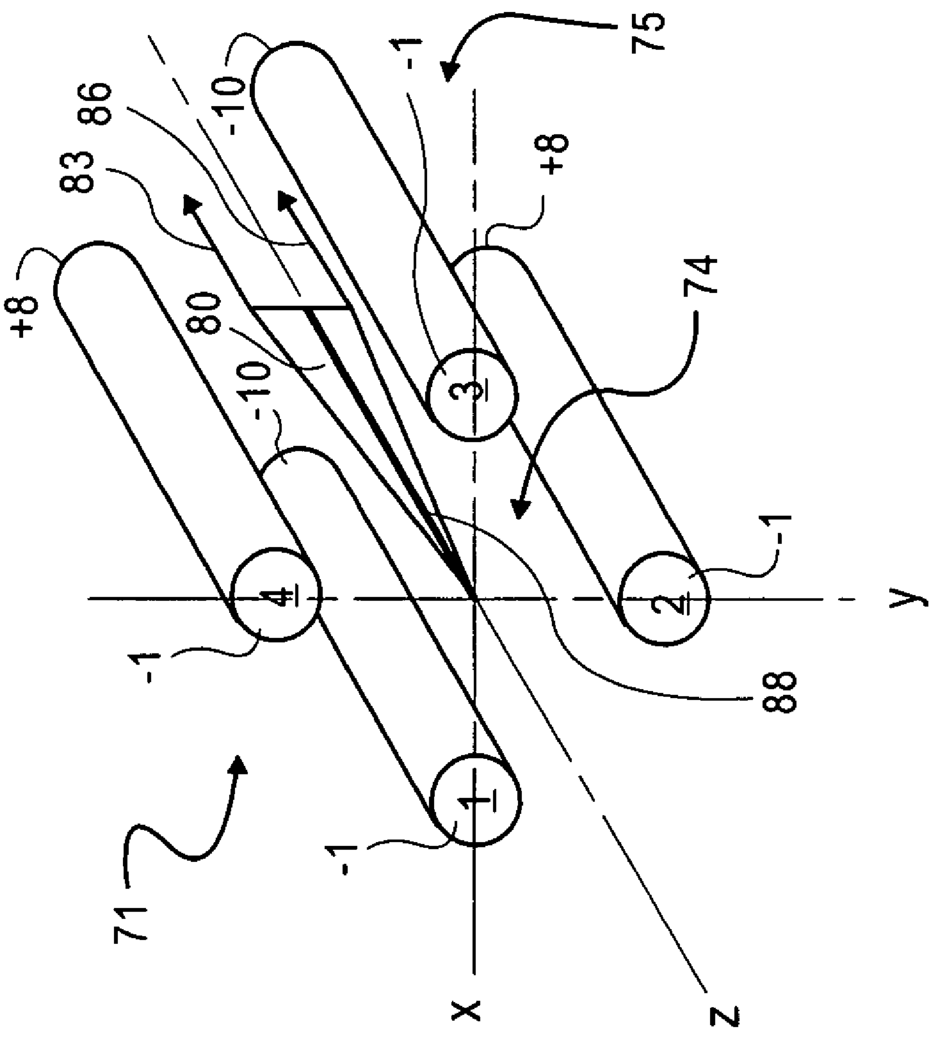
FIG. 11 is a diagrammatic view of rod electrodes to which equal and opposite voltages are applied.

A large variety of ranges of voltage gradients and combinations of gradients in the front and back axial directions are within the spirit and scope of the embodiments of the present invention. FIG. 11 shows an example of the multipole device 71 with different voltages applied for equal and opposite voltage gradients in respective transverse rod electrode pairs. Thus, the axial DC voltages are balanced or cancel each other out on the central axis. Each of the rod electrodes 1, 2, 3, and 4 have the same voltage of −1 volt at the front end. Rod electrodes 2 and 4 have +8 volts at the back end, while rod electrodes 1 and 3 have −10 volts at the back end. Thus, there is no bias or overall potential difference between the front end 74 and the back end 75. Unexcited ions will tend to spread along the central axis as indicated by the bold line 88 on the central axis, or may be urged to any potential well within the multipole. The ions can be excited and caused to drift as indicated by the planar drift 80 and/or to be ejected as indicated by arrows 83, 86, as described above.

By initially causing drift toward one axial end and then separating ions by moving them in an opposite axial direction as shown in FIG. 10, greater opportunities for separation and movement based on m/z values may be achieved, and chances for interference from space charge effects may be reduced. That is, starting the ions at one end, then exciting them and moving them toward the opposite end of the multipole device 71 allows separation of the ions along substantially an entire length with fewer adverse space charge interactions. By spreading the ions along substantially an entire length of the multipole, as shown in FIG. 11, and exciting and moving the ions axially from locations along substantially the entire length of the multipole device 71, the opportunities for separation and movement based on m/z values are greater than exciting and moving ions by way of fringing fields at ends of a multipole where space charge effects may be prevalent. By moving and separating the ions based on m/z along a greater length of the multipole device 71, the resonant frequency of the selected ions will not be adversely affected, as is often the case when attempting to excite and eject ions axially out an end by fringing fields when the ions are bunched at one end out of which they will be ejected.

While specific DC voltage gradients are shown, it is to be understood that voltage gradients having magnitudes in a range from approximately one to twenty volts on each rod electrode may be applied instead. The voltage gradients may be greater or less than values in this range and may include any combination of positive and negative values and any desired degree of biasing for urging ions along the central axis. Although two pairs of rod electrodes are shown, greater or fewer pairs may be applied without departing from the spirit and scope of the invention.

In accordance with embodiments of the present invention, a method for separating ions by m/z includes creating a DC field with at least one preferential axial component in a selected plane. A specific example of this is creating an axial DC field in one of the plane y and plane x, as described above. However, the DC field need not have components that are exclusively in one of the planes y and x. Rather, creating the axial DC field may include creating a unidirectional DC field, and exciting ions in the selected plane by the dominance of the unidirectional field even if the strongest region of the DC field does not lie exactly in the selected plane. With a preferential axial component in the selected plane, another step includes matching an auxiliary or excitation voltage with the selected plane.

Matching the auxiliary voltage and the field it creates with the selected plane includes matching a geometry of a resonant excitation voltage and field of the auxiliary voltage with a configuration of the DC voltage and the field it creates inside the multipole device. It is to be understood that matching used herein does not mean providing a perfect alignment. Rather, matching includes aligning the auxiliary or excitation voltage and field generally at, near to, or around the preferential plane. The method thus includes driving ions axially in or near to the preferential plane by the DC voltage and the resultant DC field.

One aspect that is not readily apparent when using the apparatuses and practicing the methods of the present invention is that when ions are excited off the central axis z a significant amount (which may include even small excursions), their resonant frequencies tend change. This "going off resonance" by the excited ions may give the appearance of a broadening of the range of m/z during excitation. However, when ions initially having m/z that are excited by the excitation voltage of a predetermined resonance being applied go off this resonance, these ions do not maintain their excited state and return to the central axis. To address this problem, the auxiliary or excitation voltage may be applied with a range of frequencies. For example, the auxiliary voltage may be applied as a wave form including frequency components that keep ions excited even if they move slightly off resonance. This technique can be utilized to keep the excited ions at resonant conditions even during large excursions from the central axis.

The selected wave form may excite ions of m/z values outside the desired range targeted for movement off the central axis z. While unwanted m/z values are initially excited by the extra frequencies in the wave form, the excursion of these ions off the central axis z causes their resonant frequencies to change also. Thus, the resonant frequencies of these unwanted ions move outside the range of the wave form such that these ions do not remain excited. Rather, these unwanted ions experience collisions resulting in loss of kinetic energy, loss of amplitude of excursions, and a return to an unexcited state generally at or near the central axis z.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A method of separating ions, comprising:

a) radially confining ions within an interior of a multipole by generating an RF field;

b) generating an axial DC field within the multipole interior, the magnitude of the DC field increasing with distance from a central axis;

c) mass selectively exciting ions within a first m/z range to cause the radial extents of the motion of the excited ions to increase in a first transverse plane; and d) mass selectively exciting ions within a second m/z range to cause the radial extents of the motion of the excited ions to increase in a second transverse plane different from the first transverse plane;

whereby the excited ions within the first m/z range are caused to move toward a first end of the multipole, and the excited ions within the second m/z range are caused to move toward the second, opposite end of the multipole.

2. A mass analyzer, comprising:

a multipole having a plurality of rod electrodes extending between first and second ends;

an RF voltage source for applying an RF voltage to at least a first subset of the rod electrodes to generate an RF field that radially confines ions to the interior of the multipole, such that the ions are concentrated along a central axis of the multipole;

a DC voltage source for applying DC voltages to at least a second subset of the rod electrodes to generate an axial DC field, the DC voltages being selected such that a magnitude of the DC field increases with radial distance from the central axis; and an excitation voltage source for applying a first excitation voltage to at least a third subset of the rod electrodes and a second excitation voltage to at least a fourth subset of the rod electrodes, the first excitation voltage exciting ions in a first m/z range such that the radial extents of the motion of the excited ions increase in a first transverse plane, and the second excitation voltage exciting ions in a second m/z range such that the radial extents of the motion of the excited ions increase in a second transverse plane different from the first transverse plane;

wherein the axial DC field causes the ions in the first m/z range to travel toward the first end of the multipole and ions in the second m/z range to travel toward the second end of the multipole.

3. The mass analyzer of claim 2, wherein the second excitation voltage excites all ions outside of the first m/z range.

4. The mass analyzer of claim 2, wherein the plurality of rod electrodes includes at least four main electrodes, and a set of auxiliary electrodes, each auxiliary electrode being interposed between a corresponding pair of main electrodes, and wherein the RF voltage is applied only to the main electrodes and the DC voltages are applied only to the auxiliary electrodes.

5. The mass analyzer of claim 2, wherein the plurality of rod electrodes includes four main electrodes, and the RF voltage and DC voltages are applied to the main electrodes.

6. The mass analyzer of claim 2, wherein the plurality of rod electrodes includes four electrodes arranged into first and second electrode pairs, each electrode pair having two rod electrodes opposed across the central axis.

7. The mass analyzer of claim 6, wherein the first excitation voltage is applied across the first electrode pair, and the second excitation voltage is applied across the second electrode pair.

8. The mass analyzer of claim 2, wherein the DC field at the central axis has a substantially zero magnitude.

9. The mass analyzer of claim 2, further comprising means for generating axial barriers at or proximate to the ends of the multipole.

10. A mass spectrometer, comprising:

an ion source; and a mass analyzer positioned to receive ions from the ion source, the mass analyzer including:

a multipole having a plurality of rod electrodes extending between first and second ends;

an RF voltage source for applying an RF voltage to at least a first subset of the rod electrodes to generate an RF field that radially confines ions to the interior of the multipole, such that the ions are concentrated along a central axis of the multipole;

a DC voltage source for applying DC voltages to at least a second subset of the rod electrodes to generate an axial DC field, the DC voltages being selected such that a magnitude of the DC field increases with radial distance from the central axis; and an excitation voltage source for applying a first excitation voltage to at least a third subset of the rod electrodes and a second excitation voltage to at least a fourth subset of the rod electrodes, the first excitation voltage exciting ions in a first m/z range such that the radial extents of the motion of the excited ions increase in a first plane, and the second excitation voltage exciting ions in a second m/z range such that the radial extents of the motion of the excited ions increase in a second plane different from the first plane;

wherein the axial DC field causes the ions in the first m/z range to travel toward the first end of the multipole and ions in the second m/z range to travel toward the second end of the multipole.

11. The mass spectrometer of claim 10, wherein ions in the first m/z range are ejected from the mass analyzer toward a second mass analyzer positioned to receive the ejected ions.

12. The mass spectrometer of claim 11, further comprising a collision cell interposed between the mass analyzer and the second mass analyzer.

* * * * *